US005771392A

United States Patent [19]
Razdow

[11] Patent Number: 5,771,392
[45] Date of Patent: Jun. 23, 1998

[54] ENCODING METHOD TO ENABLE VECTORS AND MATRICES TO BE ELEMENTS OF VECTORS AND MATRICES

[75] Inventor: Allen M. Razdow, Cambridge, Mass.

[73] Assignee: Mathsoft, Inc., Cambridge, Mass.

[21] Appl. No.: 668,174

[22] Filed: Jun. 20, 1996

[51] Int. Cl.[6] .............................. G06F 7/544; G06F 9/44
[52] U.S. Cl. ................................ 395/800.06; 364/754.02
[58] Field of Search ................................... 395/515, 853, 395/501, 230, 127, 122, 502, 141, 800.08, 850, 800.04, 376, 800.09, 800.03, 800.06; 364/DIG. 1, DIG. 2, 736.03, 706, 709.09, 748.2, 748.16, 724.09, 754.02; 370/435, 473, 477

[56] References Cited

U.S. PATENT DOCUMENTS

| | | | |
|---|---|---|---|
| 4,853,890 | 8/1989 | Abe et al. | 395/800.04 |
| 4,862,392 | 8/1989 | Steiner | 375/127 |
| 4,866,650 | 9/1989 | Oba et al. | 364/736.03 |
| 5,025,407 | 6/1991 | Gulley et al. | 364/748.2 |
| 5,189,633 | 2/1993 | Bonadio . | |
| 5,469,538 | 11/1995 | Razdow . | |
| 5,526,475 | 6/1996 | Razdow . | |

OTHER PUBLICATIONS

"MathSoft introduces Mathcad 6.0," *Business Wire*, Math-Soft Inc., Jun. 9, 1995.

"MathSoft looks to Internet Access Feature to Mobilise Sales of Mathcad 6.0 for Windows Beyond Traditional Base," *Apt Data Services Ltd. Computergram International*, Jun. 14, 1995.

Wingfield, Nick, "MathSoft adds E–mail, Internet links to Mathcad 6.0," *IDG Communications, Inc. InfoWorld*, Jun. 19, 1995.

Altidis, Paris C., "Mathcad 3.0: Fast, powerful, easy to use," *Design News*, May 18, 1992, p. 136.

Witten, Matthew, "MathCAD 3.1: A math–savvy whiteboard," *SUNWORLD*, Oct. 1992, p. 72.

Simon, Barry, "Mathcad 4.0: 32–Bit Power For Ultimate Math Scratch Pad," *PC Magazine*, Jun. 29, 1993, pp. 37–38.

"NASA SPINOFF: 'Smart' Software For Fast Math," *NASA Tech Briefs*, vol. 17, No. 9, Sep. 1993, p. 14.

Simon, Barry, "Mathcad Brings Numbers to Life," *PC Magazine*, Oct. 10, 1995, p. 51.

*Primary Examiner*—Daniel H. Pan
*Attorney, Agent, or Firm*—Weingarten, Schurgin, Gagnebin & Hayes LLP

[57] ABSTRACT

A method and system for encoding nested matrices and vectors. The system can be used in a live mathematical document program executed on a computer processor. The mathematical document program stores elements of matrices in contiguous memory locations in a primary memory as floating point numbers. Each scalar element is stored as a floating point number. Each matrix element is stored as a two part combination such that the two part combination occupies no more memory space than each scalar element, The first part of the two part combination including a code to indicate that the entry is a symbolic entity and the second part of the two part combination includes a pointer to a memory location storing elements of the matrix element. The scalar elements and the two part combinations are stored in contiguous memory locations in primary memory.

26 Claims, 4 Drawing Sheets

Three ways to define nested arrays...

Using range variables     Using the Matrices command     Defining element by element $m := 0..3$ $n := 0..3$     $u := \begin{pmatrix} 1 \\ 2 \end{pmatrix}$     $B_0 := 1$ $M_{m,n} := \text{identity}(m+1)$     $v := (2 \ 4)$     $B_1 := \text{identity}(2)$           $V := \begin{pmatrix} u \\ v \end{pmatrix}$     $B_2 := (B_0 \ 2 \ v)$ ——— Displaying the elements ———

$M_{0,0} = 1$     $V_0 = \begin{pmatrix} 1 \\ 2 \end{pmatrix}$     $B_0 = 1$ $M_{1,1} = \begin{pmatrix} 1 & 0 \\ 0 & 1 \end{pmatrix}$     $V_1 = (2 \ 4)$     $B_1 = \begin{pmatrix} 1 & 0 \\ 0 & 1 \end{pmatrix}$ $M_{2,2} = \begin{pmatrix} 1 & 0 & 0 \\ 0 & 1 & 0 \\ 0 & 0 & 1 \end{pmatrix}$

*FIG. 6*

-[nestshow.mcd]

File  Edit  Text  Math  Graphics  Symbolic  Window  Books  Help $m := 0..3$ $n := 0..3$ $M_{m,n} := \text{identity}(m+1)$ $u := \begin{pmatrix} 1 \\ 2 \end{pmatrix}$ $v := (2\ 4)$ $V := \begin{pmatrix} u \\ v \end{pmatrix}$ $B_0 := 1$ $B_1 := \text{identity}(2)$ $B_2 := (B_0\ 2\ v)$ ——— Displaying nested matrices $M = \begin{bmatrix} \{1,1\} & \{1,1\} & \{1,1\} & \{1,1\} \\ \{2,2\} & \{2,2\} & \{2,2\} & \{2,2\} \\ \{3,3\} & \{3,3\} & \{3,3\} & \{3,3\} \\ \{4,4\} & \{4,4\} & \{4,4\} & \{4,4\} \end{bmatrix}$ $V = \begin{pmatrix} \{2,1\} \\ \{1,2\} \end{pmatrix}$ $V^T = (\{2,1\}\ \{1,2\})$ $\text{augment}(V,V) = \begin{pmatrix} \{2,1\} & \{2,1\} \\ \{1,2\} & \{1,2\} \end{pmatrix}$ $B = \begin{pmatrix} 1 \\ \{2,2\} \\ \{1,3\} \end{pmatrix}$ $B_2 = (1\ 2\ \{1,2\})$ $(B_2)_{0,2} = (2\ 4)$ Page 1    auto

*FIG. 7*

ENCODING METHOD TO ENABLE VECTORS AND MATRICES TO BE ELEMENTS OF VECTORS AND MATRICES

FIELD OF INVENTION

The present invention is directed to a method and system to enable matrices and vectors to be elements of matrices and vectors in a mathematical document, and more particularly, to allow encoding of matrix and vector elements in a way consistent with existing representational schemes.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Mathematical document programs allow users to enter expressions and equations in worksheets and thereafter automatically calculate results. Sophisticated mathematical document programs, such as the Mathcad Plus 5.0 program produced by Mathsoft, Inc. of Cambridge, Mass., allow for the input of mathematical, scientific and statistical expressions. These expressions can be entered "freeform" in any order and placed in any position in the worksheet (called, more generally, a "document"). The Mathcad Plus 6.0 program also provides features for the input and/or creation of text, diagrams and graphs.

In the Mathcad Plus 5.0 program, the document on which expressions are entered can be considered to be a virtual white board. The expressions are entered by a user on the white board (i.e., the open document displayed on the computer screen), using known graphical user interface techniques, such as, for example, the user interface techniques of Microsoft's Windows operating system. A document can be displayed, printed, edited, and saved as a file in a computer memory. A user can enter expressions in the form that the user would write such expressions on the white board or sheet of paper, using common mathematical notations, rather than in the form of statements or equations used in programming languages or spreadsheets. The Mathcad Plus 5.0 program has an intelligent editor that interprets the expressions that are in the document. The intelligent editor can "understand" and interpret mathematical expressions as would a human mathematician, for example, by reading and interpreting a series of expressions in a document from left to right and from top to bottom.

The Mathcad Plus 5.0 program, released in January 1994, is fully described in "Mathcad Plus 5.0 User's Guide" available from Mathsoft, Inc., of Cambridge, Mass., and expressly incorporated by reference herein.

A mathematical document that allows for automatic recalculation of related mathematical expressions in a document whenever an expression is edited, modified, added, deleted or changed is known as a live document. A mathematical document in the Mathcad Plus 5.0 program is considered to be "live"—when a change is made to a variable or an expression in a Mathcad Plus 5.0 document, all related expressions are also updated, in real-time. Live numeric and live symbolic capabilities are described in applicant's patents U.S. Pat. Nos. 5,469,538 and 5,526,475, which are expressly incorporated by reference herein.

Existing mathematical document programs allow the creation of vectors and matrices, and perform calculations thereon. For example, the Mathcad Plus 5.0 program can (a) create and edit vectors and matrices, (b) define variables as arrays and use them in expressions, (c) refer to individual array elements and columns using subscripts and superscripts, (d) display vectors and matrices, and (e) perform vector and matrix operations and functions.

However, existing live mathematical documents and mathematical programming languages do not allow for matrices and vectors to be included as elements of matrices and vectors, i.e., to not allow for nested matrices and vectors.

Mathematical document programs use various representation schemes to represent numbers and other mathematical objects (such as matrices and vectors) in memory. The mathematical functions and procedures that are performed by such mathematical document programs, such as, for example, square root and trig functions, rely upon the representation scheme to perform such functions and procedures. It will be appreciated that sophisticated mathematical document programs include a very large number of mathematical functions and procedures that took many man-hours to create.

Known representation schemes used by mathematical document programs include IEEE Standard for Binary Floating-Point Arithmetic (ANSI-IEEE 754-1985) and IEEE Standard for Radix-Independent Floating-Point Arithmetic (ANSI-IEEE 854-1987), both referred to herein as "the IEEE standard formats" and expressly incorporated by reference herein. Other representation schemes also exist.

Matrices and vectors can be represented in memory in a number of ways. A common representation scheme is to place the elements of the matrix or vector in column order in contiguous locations in memory. (A less common representation scheme is to place the elements of the matrix or vector in row order in contiguous locations in memory.) Typically, each element of the matrix or vector is represented as a floating point number according to the IEEE standard formats. Functions that are performed on matrices and vectors utilize these representation schemes to obtain the proper results.

There are many possible data structures that could be used to represent nested matrices and vectors. However, not all are suitable for use in mathematical document programs. There exists a need for a representation scheme for a nested matrices and vectors that complements existing representation schemes used in mathematical document programs where the elements of non-nested matrices and vectors are represented as a list of contiguous floating point numbers in memory. In particular, such representation scheme for nested matrices and vectors should (A) accommodate non-nested matrices and vectors, (B) for each element of the matrix or vector, distinguish between elements that are regular elements and those that are matrices and vectors, (C) enable all elements to be placed in a contiguous sections of memory according to the basic principles of existing representation schemes, and (D) allow functions and procedures that were written for non-nested matrices and vectors to operate on nested matrices and vectors without crashing or otherwise adversely effecting operation of the program.

SUMMARY OF THE INVENTION

The present invention provides for nested matrices and vectors in a live mathematical document. A matrix is a two or more dimensional structure comprising a number of elements. A vector is a list of elements and could be regarded as a one dimensional matrix. According to the present invention, a nested matrix or nested vector is a matrix or vector that has one or more elements that are themselves a matrix or a vector.

The present invention utilizes a unique representation scheme to represent nested matrices and vectors in memory. The representation scheme of the present invention is designed to complement existing representation schemes for non-nested matrices and vectors. In the representative embodiment, the present invention utilizes a well-known representation scheme for non-nested matrices and vectors, namely, that elements are in column order in contiguous locations in memory and represented as floating point numbers. (It will be appreciated that the principles of the present invention also apply to other similar representation schemes for non-nested matrices and vectors.) The representation scheme used by the present invention for nested matrices and vectors does not compromise, and can be seen as a complementary extension to, existing representation schemes presently used for non-nested matrices and vectors.

According to the representative embodiment of the present invention, each element of a matrix or a vector is represented in floating point format according to one of the IEEE standard formats. If the element is a scalar, it is simply represented as a floating point number according to said IEEE standard formats. However, if the element is a matrix or a vector, then the element is represented as a "Not a Number" ("NaN") and includes a pointer to the matrix or vector element. A NaN is a symbolic entity encoded in a floating point format. According to the IEEE standard formats, there are two types of NaNs, namely a signaling NaN (that signal the invalid operator exception) and quiet NaNs (which propagate through almost every arithmetic operation without signaling exceptions). Typically, NaNs are used to code exceptions or errors, such as invalid operations, division by zero, overflow, underflow, etc. The use of NaNs allows calculations to be robust. For example, a division by zero error relating to one element of a vector will return a NaN for that calculation and not crash the program or effect other unrelated calculations that are to take place.

In short, an element of a matrix or a vector that is itself a matrix or a vector is encoded as a NaN that points to the location in memory that stores the matrix or vector element.

The representation scheme for nested matrices and vectors of the present invention distinguishes between elements that are scalar elements and those elements that are matrices and vectors. Each matrix and vector may comprise elements that are a combination of scalars, vectors and matrices.

The present invention allows for more than one level of nesting. For example, a vector may contain an element that is a two-by-two matrix that in turn may contain four elements, namely, a scalar, a vector, a matrix and a null value.

It will be appreciated that using a NaN to represent a matrix or vector element enables all elements (including matrix and vector elements) to be placed in a contiguous sections of memory according to the basic principles of existing representation schemes, such as a representation scheme where elements are in column order in contiguous locations in memory and represented as floating point numbers. This is because a NaN takes the same amount of space as a regular scalar element. Thus, including a matrix or a vector as an element in a matrix or a vector does not adversely effect the contiguous nature of the storage scheme.

The present invention allows previously written functions and procedures that were created for non-nested matrices and vectors to operate without crashing when encountering a nested matrix or vector. When a previously written function unexpectedly encounters an element that is a matrix or a vector, it treats it as a NaN according to usual error handling procedures, such as those set forth in the IEEE standards.

In the representative embodiment of the present invention, a matrix or vector element nested in a matrix or vector is displayed to the user as coordinate pair showing the row and column size of the matrix or vector element, e.g., {3,2} or {1,7}. Thus, each element in a matrix or a vector is displayed either as a number when the element is simply a number or as an ordered pair (m,n) where m and n are the number of rows and columns in the matrix or vector occupying that element. If a user "clicks" on the ordered pair, then the present invention will cause the matrix or vector element to be displayed to the user.

The present invention includes functions designed for nested matrices and vectors, such as, for example, a boolean equal function to determine if two nested matrices or vectors are equal, and read and write functions that will read from and write to disk nested matrices and vectors, including all the contents of all elements. Because elements of a matrix or vector are no longer necessarily numbers, the present invention's boolean equal function is used to determine equality of nested matrices and vectors. This function ensures, for example, that if matrix or vector has a {3,1} matrix as an element, then another similar matrix or vector with a {3,1} matrix as an element in the same position is termed equal only if the value of every element of both the parent matrix and the nested matrix is the same as the corresponding element in the other parent and nested matrix.

Advantages of the present invention include simplicity of implementation using, where possible, existing code and data structures, and robustness (as the IEEE format allows for the propagation of error conditions). Further, by allowing matrices and vectors to be included as elements of other matrices and vectors, functions can be written that return more complex values (e.g., both numbers and vectors).

DETAILED DESCRIPTION

Figure 1:
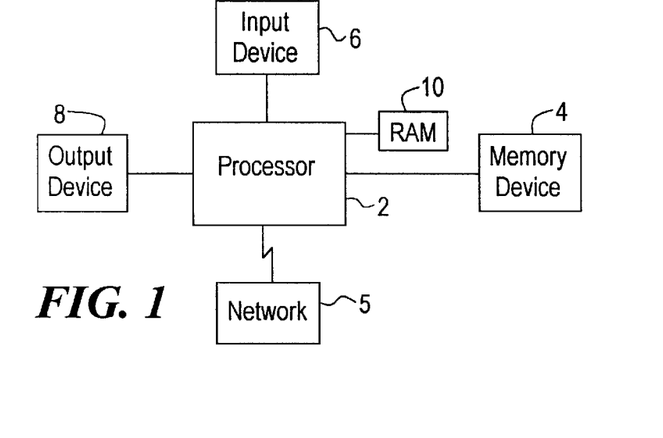
FIG. 1 is a block diagram of exemplary hardware that can be used in conjunction with the representative embodiment of the present invention.

Referring now to the drawings, and initially to FIG. 1, there is illustrated in block diagram form exemplary hardware that can be used in conjunction with the representative embodiment of the present invention. A processor 2, such as, for example, an IBM brand compatible personal computer with a Intel PENTIUM chip, is coupled to a memory device 4, such as a hard disk drive, that stores a computer program according to the present invention. The computer program is executed by the processor 2 to control and coordinate the apparatus and method of the present invention. Data that is manipulated by the processor 2, such as, for example, electronic documents that include mathematical expressions, can be stored in the memory device 4. Input devices 6, such as a keyboard and a mouse, are coupled to the processor 2. A user can enter, for example, data using the input device. Input can also be received from another processor—for example, the input to the present invention can be received over a network 5, such as the Internet. An output device 8, typically a computer monitor or CRT, is coupled to the processor 2, for displaying output, such as, for example, the electronic document the user is currently creating and editing. The processor is coupled to a primary memory device 10, such as random access memory (RAM). Typically, the above components are coupled via a bus.

A user can enter an expression via input device 6. The expression is stored in primary memory 10 according to the format designated by the present invention. The information stored in memory 10 can then be used by the processor 2, for example, to complete the user-designated operations to be performed on the data. Examples of how the data will be manipulated by the processor include a variety of numeric, symbolic and matrix calculations and operations.

The present invention supports the IEEE standard formats for encoding binary floating-point expressions and radix-independent expressions. Numeric operations are performed according to these standard formats. Preferably, each number is encoded as 64-bit double format number. Although the representative embodiment of the present invention is implemented according to the IEEE standard formats, it can easily be modified to support a variety of other formats, such as the MSBIN format and formats used by Apple Computer processors. Accordingly, where used herein, the term NaN should be read to mean any symbolic entity encoded in floating point format and should not be limited to the IEEE standard specification of a NaN.

According to the IEEE standard format No. 754, each 64-bit double format number is represented as follows: one bit is the sign bit, 11 bits are the exponent and 52 bits are the mantissa. The value 2048 for the biased exponent is defined as a NaN.

The present invention utilizes a common representation scheme for non-nested matrices and vectors, namely, that elements are in column order in contiguous locations in memory and represented as floating point numbers, for example, according to the IEEE standard formats. Each element of a matrix or a vector that is itself a matrix or vector is represented as a NaN that points to the location in memory that stores the matrix or vector element.

Thus, according to the present invention, where an element of a matrix or a vector is another matrix or vector, then such element is represented as a symbolic entry in floating point format (e.g., a NaN) and which points to a memory location for the matrix or vector element.

Generally, each matrix or vector element of a matrix or vector is represented in two parts, namely, an indication that the entry is a symbolic entity (e.g., not a number) and a pointer to the location of the matrix or vector element.

Accordingly, one representation of a nested matrix or vector element within the principles of the present invention could be 64-bit floating point number, where a first 32 bits indicate that the element is a NaN defined according to the present invention as indicating that the element comprises a nested matrix or vector element and a second 32 bits indicate a location in memory where the nested matrix or vector element is stored.

No existing system known to the Applicant uses the undesignated bits of a NaN as a pointer to a matrix or a vector. Moreover, no existing live mathematical document program has solved the problem of representing nested matrices and vectors according to a scheme that allows the continued use of existing numerical routines and matrix operations.

The present invention allows live mathematical documents and mathematical programming languages to provide matrices and vectors that have matrices and vectors as elements.

Figure 2:
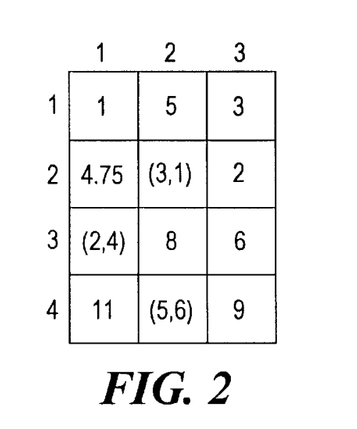
FIG. 2 is an example nested matrix.

FIG. 2 is an example of a matrix which can be stored and processed by the present invention. (It is assumed that the origin is one.) The matrix comprises scalar, vector and matrix elements, which are stored in internal memory 10 all in accordance with the IEEE standard for floating-point numbers. It can be seen that the matrix is a three by four matrix. Element (3,2) is the scalar eight. Element (2,2) is shown to be a vector having three elements. Element (3,1) is shown to be a two by four matrix.

Figure 3:
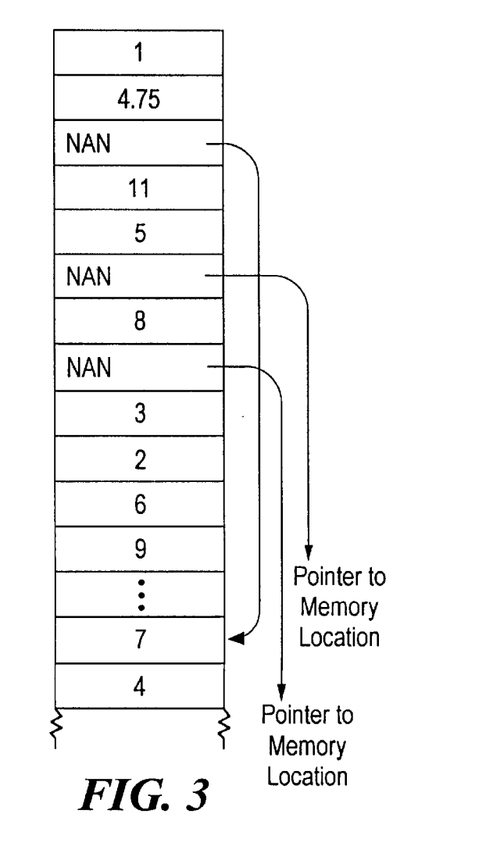
FIG. 3 is a representation of memory locations storing the nested matrix of FIG. 2.

FIG. 3 represents the continuous memory segment of memory 10 that stores the matrix of FIG. 3. For example, that element (3,1) indicates that the value is a NaN and includes a pointer to another memory location. It can be seen that the matrix, although it includes three elements that are not scalars, is continuous in memory 10.

Figure 4:
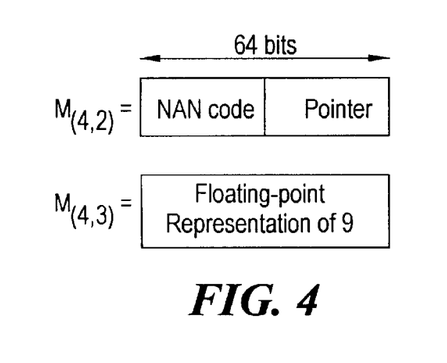
FIG. 4 is a representation of how the elements of the matrix of FIG. 2 would be encoded and stored in memory.

FIG. 4 represents illustrates two internal memory locations for the matrix of FIG. 3. For element (4,2), which is a matrix, the memory location includes two parts, a NaN code and a pointer to the memory location storing a six by seven matrix. For element (4,3), the scalar nine is encoded in a floating point representation.

The IEEE standard encodes elements that are not numbers, such as error and overflow conditions, by assigning them special values. With this scheme, a "bad" value is propagated through the remainder of the calculations and does not affect the integrity or accuracy of any of the results. Using NaNs to indicate that the element is a matrix or a vector makes the present invention more robust. As errors are propagated through the program (and possibly with an appropriate error message output to the user) a function or procedure that operates on a matrix or vector and unexpectedly encounters an element that is a matrix or a vector will not crash.

In the representative embodiment, scalar elements and vector or matrix elements are both stored as 64-bits. The processor 2, when programmed according to the present invention, uses the NaN code to recognize the difference between a matrix or vector element and a scalar element.

The present invention includes a function to determine if two nested matrices or vectors are equal. This boolean equal function performs a deep equality comparison—it determines if all the values of each nested matrix or vector are equal. Attached as Appendix A and expressly incorporated herein is an example program module called ceq written in C++, that determines if two nested matrices or vectors that are represented according to the principles of the present invention are equal.

When a matrix or vector is written to memory 4, the program module that writes the matrix or vector (in the representative embodiment, called WritePRN) also ensures that the included matrix and vector elements, and not just the pointer values, are also written to disk. A corresponding module, in the representative embodiment called ReadPRN, operates according to similar principles to read a nested matrix from secondary memory 4. Attached as Appendix B and expressly incorporated herein is an example program module called ReadPRN, written in C++, that can be used to read a nested matrix or vector from secondary memory 4. (In the representative embodiment, ReadPRN is a function that is also used to read a structured data file—a data file with a fixed number of values per line—by reading the entire data file, determining the number of rows and columns, and creating a matrix out of the data. Here, all lines in the data file should have the same number of values. ReadPRN ignores text and lines containing no values. The results of reading a data file is an m by n matrix where m is the number of lines containing data in the file and n is the number of values per line. It is noted that the above is modified where nested matrices and vectors are read, as specified in Appendix B.)

The present invention can also include a garbage collector module to reclaim unused memory once a matrix or vector is deleted. Upon deletion of a matrix or vector element, the pointer is set to null and the corresponding memory location is freed. The garbage collector module ensures that if a matrix or vector to be deleted includes a matrix or vector element that is used elsewhere, then the included matrix or vector element is not deleted.

The present invention is particularly suited for use in a live mathematical document program. It can also be used in conjunction with electronic books and as part of mathematical programming languages. An electronic book can be regarded as a document with hyperlinks, a searchable index and a table of contents. Typically, the index and table of contents comprise hyperlinks to the corresponding entries and chapters. An electronic book can be displayed on the output device 8. An example of an electronic book is Mathcad's Treasury of Methods and Formula, published by Mathsoft, Inc.

Figure 5:
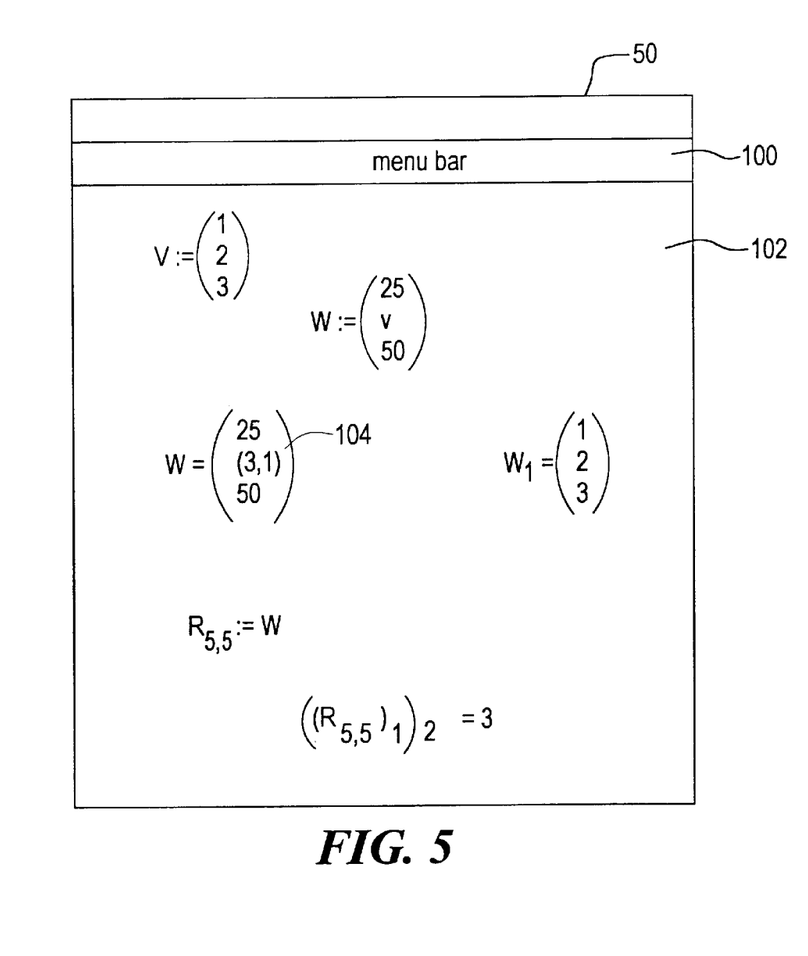
FIG. 5 is an example of nested matrix operations according to the present invention.

FIG. 5 shows a simple example of matrices entered by a user into a document of a live mathematical document program. Here, it is assumed that the user enters the expressions from top to bottom, although the user is under no restriction to do so. The screen display window 50 includes a menu bar section 100 and a worksheet area 102 where the user can enter expressions and where results are displayed. In this example, the user first enters a definition for a vector V. On the next line, the user enters a definition for a vector W. The second element of vector W is defined by the user to be vector V. On the next line, when the user enters "w=", the present invention will cause the result to be displayed, i.e., the vector on the right hand side of the equal sign. Notice that the second element is shown as (3,1) to signify that this element is a three element vector. When the user enters "$W_1=$", then the present invention will cause that element to be displayed, i.e., the vector V. On the next line, the user assigns a value to $R_{5,5}$ thus creating a 5 by 5 matrix where the (5,5) element is the vector W. The last line shows the results of a more complex request by the user. As the document is live, if the user changes the elements of V to be (3,4,5), then the third and fifth lines will automatically update to show the correct results, without further user intervention.

In FIG. 5, if the user places the cursor on the element marked 104 and selects that element, then the present invention will cause the vector V to be displayed.

Figure 6:
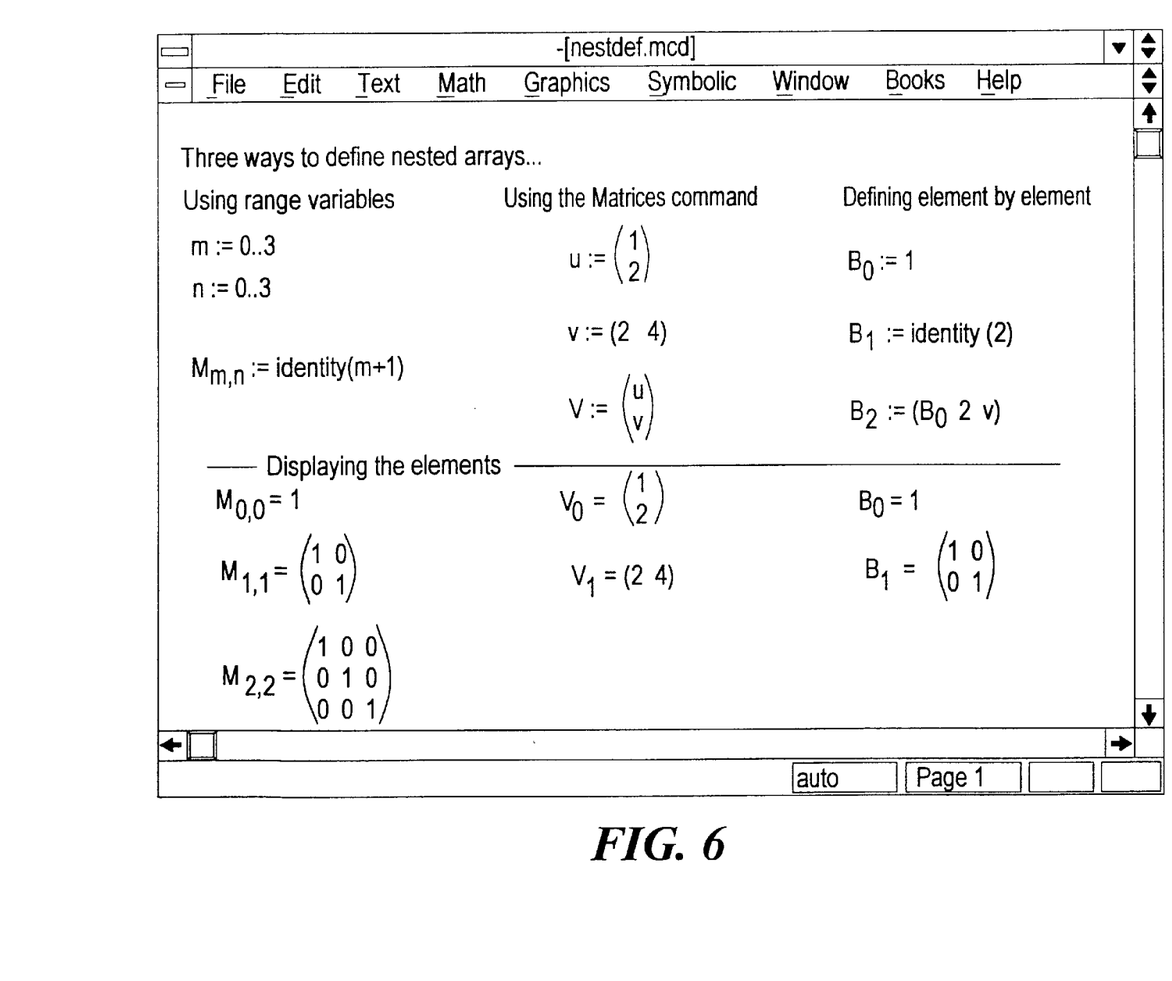
FIG. 6 is an example screen display illustrating various ways to define a matrix of matrices.
Figure 7:
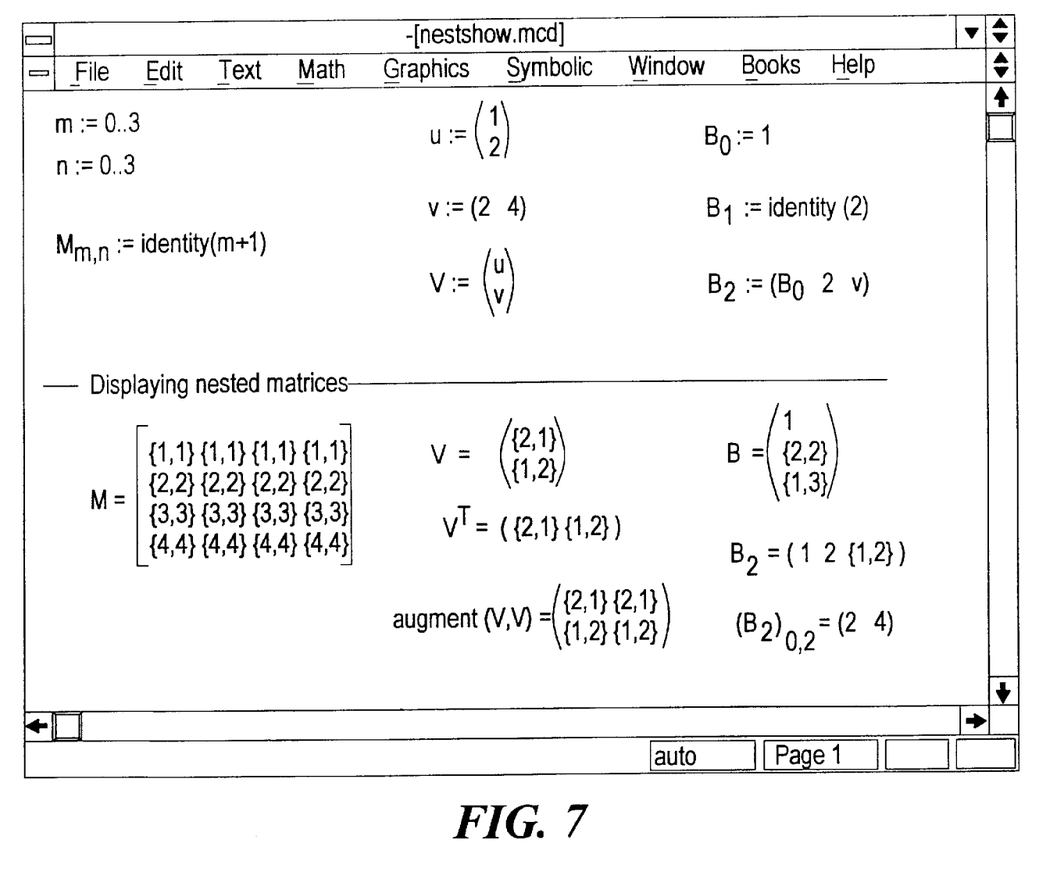
FIG. 7 is an example screen display illustrating display of nested matrices.

FIG. 6 shows an example screen display illustrating three ways to define a matrix of matrices: using range variables, element by element, and with a "Matrices" command from the "Math" menu on the menu bar. FIG. 7 shows another example screen display illustrating display of nested matrices.

The following are examples of operators and functions for nested matrices that can be used according to the present invention: transpose (interchanges rows and columns), superscript (returns a vector being the column specified in the superscript), vector subscript (returns the element of the vector specified in the subscript), matrix subscript (returns the element of the matrix specified in the subscript), Rows (A) (returns number of rows in matrix A), cols(A) (returns number of columns in matrix A), length(v) (returns number of elements in vector v), last(v) (returns index of last element in vector v), stack (A,B) (forms an array by placing A above B) and boolean equals (discussed above.)

- 16 -

APPENDIX A
(Untitled)

```
//
// New generalized equals void ceq(eqRegion* e, TREE t)
{
   int bool;
   struct anyval *vl = stkPtr-1;
   struct anyval *vr = stkPtr-2;

// First handle Constraints if(tstAttr(t,isConstraint))
   {
        if(MAT_TYPE&(vl->type|vr->type)) {
                eqErrCode(e, t, msgDomainErr);
                return;
        }
        csub();   /* difference is enough if constraint... */
        return;
   }

// Next handle possible direct pointer comparisons:

bool = comparePtrs(stkPtr-1);

if(bool) {
      svFree(--stkPtr); svFree(--stkPtr);
      pushReal((double)(bool - 1));
      return;
   }

// Now handle non-pointers:
   // extended to general equality if(!(MAT_TYPE&(vl->type|vr->type))){
    //Compare Scalars:
        bool = newApproxEq(vr->val.scalar.rp,
                        vl->val.scalar.rp);
        if(IMAG_TYPE&(vl->type|vr->type)){
        bool = bool && newApproxEq(vr->val.scalar.ip,
                        vl->val.scalar.ip);
        }
        svFree(--stkPtr);
        svFree(--stkPtr);
        pushReal((double)bool);
        return;
```

- 17 -
(Untitled)
```
} else if((MAT_TYPE&vl->type) && (MAT_TYPE&vr->type)) {

//Compare Matrices:
// do this iteratively so we don't rely on
// program stack space.

struct anyval *nextVall,*nextValr;
   anylist *ss,*sp,*st;
   int curComplex,rows,cols,arl,arr,anyMore,i,j,kl,kr,pl,pr;
   double *rpl,*ipl,*rpr,*ipr;

ss = sp = 0;
      anyMore = 1;

while(anyMore--) { curComplex = (vl->type&IMAG_TYPE)?1:0;
      curComplex = curComplex || ((vr->type&IMAG_TYPE)?1:0);
      rows = vl->val.array.dims[0];
      cols = vl->val.array.dims[1];
      rpl = vl->ARP;
      ipl = vl->AIP;
      arl = vl->val.array.allocSize/(cols*sizeof(double));
      rpr = vr->ARP;
      ipr = vr->AIP;
      arr = vr->val.array.allocSize/(cols*sizeof(double));

//make sure matrices are commensurate if(
         rows != vr->val.array.dims[0]
         || cols != vr->val.array.dims[1]) { goto negExit;
      }

// Compare elements:

for(i=0; i<rows; i++)
        for(j=0; j<cols; j++) { kr = j*arr + i;
            kl = j*arl + i;

pl = getPtrFromDouble(rpl[kl],&nextVall);
            pr = getPtrFromDouble(rpr[kr],&nextValr);
```

- 18 -
(Untitled)

```
                if((pr && !pl) || (pl && !pr))
                        goto negExit;

if(pr && pl){
                        if(nextVall != nextValr) {
                          if(sp) {
                                sp->fwd = (anylist *)buy(sizeof(anylist));
                                sp = sp->fwd;
                          } else {
                                ss = sp = (anylist *)buy(sizeof(anylist));
                          }
                          sp->val.val.scalar.rp = rpr[kr];
                          sp->val.val.scalar.ip = rpl[kl];
                          anyMore++;
                        }
                }
                else
                if(curComplex) {
                  if(!( newApproxEq(eqRef(rpr,kr),eqRef(rpl,kl))
                        && newApproxEq(eqRef(ipr,kr),eqRef(ipl,kl)
)) ))
                        goto negExit;;
                } else {
                  if(!newApproxEq(rpr[kr],rpl[kl])) goto negExit;
                }

}
        if(ss && anyMore){
                getPtrFromDouble(ss->val.val.scalar.rp,&vr);
                getPtrFromDouble(ss->val.val.scalar.ip,&vl);
                st = ss;
                ss = ss->fwd;
                if(st==sp)sp = 0;
                sell((char *)st,sizeof(anylist));
        }

}
   goto posExit;

// come here to free storage and return TRUE/FALSE
   negExit:
```

```
                                - 19 -
                              (Untitled)
        svFree(--stkPtr);
        svFree(--stkPtr);
        pushReal((double)0);
        goto memExit;
     posExit:
        svFree(--stkPtr);
        svFree(--stkPtr);
        pushReal((double)1.0);
     memExit:
      while(ss){
             st = ss;
             ss = ss->fwd;
             sell((char *)st,sizeof(anylist));
        } return;

} else {
   //...unequal... push a 0:

pushReal((double)0.0);
        return;
   }

}
```

APPENDIX B
(Untitled)
```
FSTATIC bool readNewPrn(FILE *fp){
//assume fp points beyond .MCDPRN ready to read parameters
int curId,isComplex,rows,cols,i,j,k,size;
int nextId,nextIsComplex,nextRows,nextCols,anyMore;
struct anyval curMatrix,topMatrix;
anylist *ss, *sp, *st;
int c;
double *rp,*ip;
bool firstOne;

ss = sp = 0;
    curMatrix = getBlankVal();
    topMatrix = getBlankVal();

anyMore = 1;
    firstOne = TRUE;

while(anyMore) { while((c=getc(fp)) != '.'){
               if(c == EOF)goto newFail;
       } if(4 != fscanf(fp,"MATRIX %d %d %d %d",&curId,&isComplex,
&rows,&cols))
               goto newFail;

curMatrix.type = MAT_TYPE|TEMP_TYPE|(isComplex?CPLX_TYPE:
REAL_TYPE);

curMatrix.val.array.allocSize = size = rows*cols*sizeof(d
ouble);

curMatrix.val.array.dims[0] = rows;
       curMatrix.val.array.dims[1] = cols;

if(!(curMatrix.val.array.rvp = rp = (double *)buy(size)))
goto newFail;
       if(isComplex &&
           !(curMatrix.val.array.ivp = ip = (double *)buy(size)))
goto newFail;

for(i=0; i<rows; i++)
         for(j=0; j<cols; j++) { k = j*rows + i;
```

- 21 -
(Untitled)

```
            while(strchr("  \n",c = getc(fp)));
            switch(c){
              case EOF:
                    goto newFail;

case '{':
                    if(McadAppPtr()->is_highend()){
                            if(4 != fscanf(fp,"%d,%d,%d,%d}",
                                    &nextId,&nextIsComplex,&nextRows,&nextCols))
                                            goto newFail;
                            if(sp) {
                                    sp->fwd = (anylist *)buy(sizeof(anylist));
                                    sp = sp->fwd;
                            } else {
                                    ss = sp = (anylist *)buy(sizeof(anylist));
                            }
                            sp->val.type = nextId;
                            sp->val.val.array.rvp = rp+k;

anyMore++;
                    } else {
                            goto newFail;
                    }
                    break;
              default:
                    ungetc(c,fp);
                    if(isComplex) {
                      if(2 != fscanf(fp,"%lf,%lf",rp+k,ip+k))
                            goto newFail;
                    } else {
                      if(1 != fscanf(fp,"%lf",rp+k))
                            goto newFail;
                    }
                    break;
            }
        }
        if(firstOne) {
```

- 22 -
(Untitled)

```
                topMatrix = curMatrix;
                curMatrix = getBlankVal();
                firstOne = FALSE;
        } else {
                if(ss && curId == ss->val.type){
                    *(ss->val.val.array.rvp) = getDoubleFromPtr(
                        win_document(curwin)->myHeap.addVal(&curMatrix));
                    curMatrix = getBlankVal();
                    st = ss;
                    ss = ss->fwd;
                    if(st==sp)sp = 0;
                    sell((char *)st,sizeof(anylist));
                } else goto newFail;
        } anyMore--;
    }

*(stkPtr-1) = topMatrix;

return TRUE;

newFail:
//reclaim partially read data and return if(rp=curMatrix.val.array.rvp)
            sell((char *)rp,curMatrix.val.array.allocSize);
        if(ip=curMatrix.val.array.ivp)
            sell((char *)ip,curMatrix.val.array.allocSize);

if(rp=topMatrix.val.array.rvp)
            sell((char *)rp,topMatrix.val.array.allocSize);
        if(ip=topMatrix.val.array.ivp)
            sell((char *)ip,topMatrix.val.array.allocSize);

while(ss){
                st = ss;
                ss = ss->fwd;
                sell((char *)st,sizeof(anylist));
        } return FALSE;

}
```

What is claimed is:

1. For use in a live mathematical document program executed on a computer processor, the mathematical document program storing elements of matrices in contiguous memory locations in a primary memory as floating point numbers, a system for storing and operating on a nested matrix having scalars and matrices as elements, comprising:

means for storing each matrix element as a floating point number;

means for storing each matrix element as a two part combination such that the two part combination occupies no more memory space than each scalar element, the first part of the two part combination including a code to indicate that the entry is a symbolic entity and the second part of the two part combination including a pointer to a memory locating storing elements of the matrix element, wherein the scalar elements and the two part combinations are stored in contiguous memory locations in primary memory;

means for displaying the nested matrix on an output device;

means for determining whether an element of the nested matrix is a scalar element or a matrix element; and means for performing mathematical operations designed for non-nested matrices on the nested matrix such that said operations report an error condition without adversely affecting other operations of the live mathematical document program.

2. The system of claim 1 wherein the scalar elements and the two part combinations are stored in contiguous memory locations in primary memory according to column order.

3. The system of claim 1 wherein the scalar elements and the two part combinations are stored in contiguous memory locations in primary memory according to row order.

4. The system of claim 1 wherein the means for displaying further comprises means for displaying each matrix element as an ordered pair (m,n) where m and n are the number of rows and columns in the matrix element.

5. The system of claim 4 further comprising means for selecting the ordered pair to cause the contents of the matrix element to be displayed.

6. The system of claim 1 further comprising means for determining whether two nested matrices are equal.

7. The system of claim 1 further comprising means for reading nested matrices from a secondary storage device.

8. The system of claim 1 further comprising means for writing nested matrices to a secondary storage device.

9. The system of claim 1 wherein the matrix element comprises a vector element.

10. The system of claim 1 wherein the nested matrix comprises a vector.

11. For use in a live mathematical document program executed on a computer processor, the mathematical document program storing elements of matrices in contiguous memory locations in a primary memory as floating point numbers, a system for storing a nested matrix having scalars and matrices as elements, comprising:

means for storing each scalar element as a floating point number;

means for storing each matrix element as a two part combination such that the two part combination occupies no more memory space than each scaler element, the first part of the two part combination including a code to indicate that the entry is a symbolic entity and the second part of the two part combination including a pointer to a memory location storing elements of the matrix element; and means for determining whether an element of the nested matrix is a scalar element or a matrix element, wherein the scalar elements and the two part combinations are stored in contiguous memory locations in primary memory.

12. The system of claim 11 further comprising means for performing mathematical operations designed for non-nested matrices on the nested matrix without adversely effecting other operations of the live mathematical document program.

13. The system of claim 11 further comprising means for displaying the nested matrix wherein each matrix element is displayed as an ordered pair (m,n) where m and n are the number of rows and columns in the matrix element and each scalar element is displayed as a number.

14. The system of claim 13 further comprising means for selecting the ordered pair to cause the contents of the matrix element to be displayed.

15. For use in a mathematical program storing elements of matrices in contiguous memory locations in a primary memory as floating point numbers, a system for storing and operating on a nested matrix having scalars and matrices as elements, comprising;

means for storing each scalar element as a floating point number;

means for storing each matrix element as a two part combination such that the two part combination occupies no more memory space than each scalar element, the first part of the two part combination including a code to indicate that the entry is a symbolic entity and the second part of the two part combination including a pointer to a memory location storing elements of the matrix element, wherein the scalar elements and the two part combinations are stored in contiguous memory locations in primary memory;

means for determining whether an element of the nested matrix is a scalar element or a matrix element; and means for performing mathematical operations designed for non-nested matrices on the nested matrix without adversely affecting other operations of the mathematical program.

16. For use in a live mathematical document program executed on a computer processor, the mathematical document program storing elements of matrices in contiguous memory locations in a primary memory as floating point numbers, a method for storing and operating on a nested matrix having scalars and matrices as elements, comprising;

entering a nested matrix having scalar elements and matrix elements;

storing each scalar element as a floating point number;

storing each matrix element as a two part combination such that the two part combination occupies no more memory space than each scalar element, the first part of the two part combination including a code to indicate that the entry is a symbolic entity and the second part of the two part combination including a pointer to a memory location storing elements of the matrix element, wherein the scalar elements and the two part combinations are stored in contiguous memory locations in primary memory;

determining whether an element of the nested matrix is a scalar element or a matrix element;

performing a mathematical operation designed for non-nested matrices on the nested matrix such that said mathematical operation reports an error condition without adversely affecting other operations of the live mathematical document program; and displaying the nested matrix on an output device.

17. The method of claim 16 wherein the scalar elements and the two part combinations are stored in contiguous memory locations in primary memory according to column order.

18. The method of claim 16 wherein the scalar elements and the two part combinations are stored in contiguous memory locations in primary memory according to row order.

19. The method of claim 16 wherein the step of displaying further comprises the step of displaying each matrix element as an ordered pair (m,n) where m and n are the number of rows and columns in the matrix element.

20. The method of claim 19 wherein the step of display further comprises the step of allowing a user to select the ordered pair to cause the contents of the matrix element to be displayed.

21. The method of claim 16 further comprising the step of determining whether two nested matrices are equal.

22. The method of claim 16 further comprising the step of storing the nested matrix in a secondary storage device.

23. The method of claim 16 wherein the step of enetering further comprising the step of readin a nested matrix from to a secondary storage device.

24. For use in a live mathematical document program executed on a computer processor, the mathematical document program storing elements of matrices in contiguous memory locations in a primary memory as floating point numbers, a method for storing a nested matrix having scalars and matrices as elements, comprising:

storing each scalar element as a floating point number;

storing each matrix element as a two part combination such that the two part combination occupies no more memory space than each scalar element, the first part of the two part combination including a code to indicate that the entry is a symbolic entity and the second part of the two part combination including a pointer to a memory location storing elements of the matrix element, wherein the scalar elements and the two part combinations are stored in contiguous memory locations in primary memory determining whether an element of the nested matrix is a scalar element or a matrix element; and performing mathematical operations designed for non-nested matrices on a nested matrix without adversely affecting other operations of the mathematical program.

25. For use in a mathematical program storing elements of matrices in contiguous memory locations in a primary memory as floating point numbers, a method for storing and operating on a nested matrix having scalars and matrices as elements, comprising:

storing each scalar element as a floating point number;

storing each matrix element as a two part combination such that the two part combination occupies no more memory space than each scalar element, the first part of the two part combination including a code to indicate that the entry is a symbolic entity and the second part of the two part combination including a code to indicate that the entry is a symbolic entity and the second part of the two part combination including a pointer to a memory location storing elements of the matrix element, wherein the scalar elements and the two part combinations are stored in contiguous memory locations in primary memory;

determining whether an element of the nested matrix is a scalar element or a matrix element; and performing mathematical operations designed for non-nested matrices on a nested matrix without adversely affecting other operations of the mathematical program.

26. The method of claim 25 wherein the code to indicate that the entry is a symbolic entity is a NaN code.

* * * * *